United States Patent [19]

Peter et al.

[11] Patent Number: 4,855,427

[45] Date of Patent: Aug. 8, 1989

[54] EPOXY RESINS OBTAINED FROM REACTION OF EPOXYALKYL HALIDES AND AROMATIC HYDROXYL-CONTAINING MELAMINES

[75] Inventors: Roland Peter, Ludwigshafen; Klaus Ebel, Mutterstadt; Thomas Allspach, Bad Duerkheim, all of Fed. Rep. of Germany

[73] Assignee: BASF Aktiengesellschaft, Ludwigshafen, Fed. Rep. of Germany

[21] Appl. No.: 206,127

[22] Filed: Jun. 13, 1988

[30] Foreign Application Priority Data

Jun. 24, 1987 [DE] Fed. Rep. of Germany ....... 3720851

[51] Int. Cl.$^4$ ........................................... C07D 405/12
[52] U.S. Cl. ..................................... 544/198; 528/96; 525/531
[58] Field of Search .................. 544/196, 198; 528/96, 528/98, 99

[56] References Cited

FOREIGN PATENT DOCUMENTS 0051734 5/1982 European Pat. Off. .
0773874 5/1957 United Kingdom .

Primary Examiner—Allan M. Lieberman
Assistant Examiner—Robert E. L. Sellers, II
Attorney, Agent, or Firm—Oblon, Spivak, McClelland, Maier & Neustadt

[57] ABSTRACT

Epoxy resins obtained from an epoxyalkyl halide and an aromatic hydroxyl-containing melamine derivative, and vinyl ester resins based on a reaction product of the epoxy resin with an unsaturated monocarboxylic acid can be cured to give molded materials having high heat distortion resistance.

1 Claim, No Drawings

EPOXY RESINS OBTAINED FROM REACTION OF EPOXYALKYL HALIDES AND AROMATIC HYDROXYL-CONTAINING MELAMINES

The present invention relates to epoxy resins which are based on melamine derivatives and can be cured to give molded materials having high heat distortion resistance and improved flameproofing properties, and vinyl ester resins which are prepared therefrom and have similar advantageous properties.

Epoxy resins are usually prepared by reacting epoxyalkyl halides with polyvalent aromatic hydroxy compounds. By reacting the latter with unsaturated monocarboxylic acids, it is possible to prepare the corresponding vinyl esters. Molded materials which are prepared by curing the conventional epoxy or vinyl ester resins have satisfactory toughness and good resistance to chemicals but have unsatisfactory heat distortion resistance for some purposes.

It is an object of the present invention to provide epoxy and vinyl ester resins which can be cured to give molded materials having improved heat distortion resistance.

We have found that this object is achieved, according to the invention, by incorporating an aromatic hydroxyl-containing melamine derivative in the epoxy resin.

The novel epoxy resins are obtained by reacting an epoxyalkyl halide, preferably epichlorohydrin, with an aromatic hydroxyl-containing melamine derivative. The latter is preferably a reaction product of a cyanohalide and an amine which has one or two aromatic rings and is substituted ortho, meta or para to the amino group by one or more hydroxyl groups. Examples of suitable amines are N-methylamino-p-phenol, N-methylamino-o-cresol, N-phenylamino-p-phenol, 1-(N-methyl-amino)-5-hydroxynaphthalene and 1-(N-methylamino)-4-hydroxy-naphthalene.

Particularly preferred melamine derivatives are those of the general formula

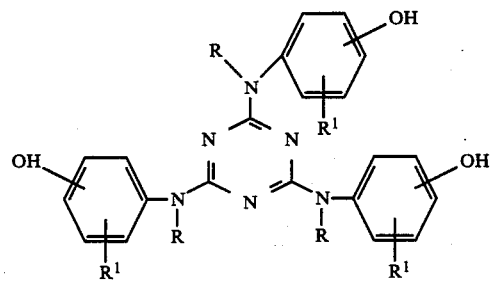

where R is hydrogen, alkyl or aryl and $R^1$ is hydrogen, alkyl, aryl or aralkyl or a fused-on aromatic ring. R and $R^1$ should preferably have not more than 12, in particular not more than 6, carbon atoms. The position of the hydroxyl group is not specified, although preferred compounds are those in which the OH group is para to the amino group.

The reaction of the epoxyalkyl halide with the polyphenol may be carried out either in one step or in two stages with isolation of the chlorohydrin ether intermediate. The usual epoxidation catalysts, such as ammonium, phosphonium or arsonium salts, are used. The dehydrohalogenation is carried out in the presence of a base, eg. potassium carbonate or aqueous sodium hydroxide or potassium hydroxide solution. The hydroxyl-containing melamine derivative can, if required, be partially replaced, preferably to an extent of less than 40 mol %, by conventional polyphenols, eg. bisphenol A.

The epoxy resins according to the invention can be used directly for the production of molded materials, for example shaped articles, fiber-reinforced materials, coatings and adhesives. For this purpose, conventional curing agents, alone or together with curing accelerators, are added to the epoxy resins in amounts of from 1 to 150, preferably from 3 to 100, parts by weight per 100 parts by weight of epoxy resin, and curing is carried out at elevated temperatures. Suitable curing agents are polyamines, polycarboxylic anhydrides and catalytic curing agents, eg. hydrazides. Bis-(4-aminophenyl)-methane, bis-(4-aminophenyl)sulfone, bis-(4-aminophenyl)ketone and dicyanodiamide are particularly preferred. Conventional additives, such as reinforcing fibers of glass or carbon, fillers, plastics and metal powders, may be mixed with the epoxy resins. The molded materials obtained on curing possess good resistance to chemicals, high heat distortion resistance and excellent flame retardance.

The epoxy resins may furthermore be used for the preparation of the corresponding vinyl esters. For this purpose, they are reacted with unsaturated monocarboxylic acids. Preferred monocarboxylic acids are acrylic acid, methacrylic acid and half-esters of unsaturated dicarboxylic acids, for example of maleic acid. The reaction is carried out in the absence of a catalyst or in the presence of a Lewis base, eg. a tertiary amine, a triarylphosphine, an acetate, an alcoholate or an ammonium halide, at from 60° to 130° C. in an inert solvent or in the melt. Preferably from 0.6 to 1.1 equivalents of the unsaturated monocarboxylic acid are used per epoxide group. In the preparation of the vinyl ester, the novel epoxy resin can be partially replaced, preferably to an extent of less than 40 mol %, by conventional epoxy resins, for example those based on bisphenol A or on novolaks.

The vinyl ester resins contain
I. from 25 to 100% by weight of the vinyl esters described,
II. from 0 to 75% by weight of an unsaturated monomer which is copolymerizable with I and
III. conventional additives.

Suitable copolymerizable, ethylenically unsaturated monomeric compounds are the allyl and, preferably, vinyl compounds usually used for the preparation of unsaturated vinyl ester resins, for example vinylaromatics, such as styrene; substituted styrenes, such as p-chlorostyrene or vinyltoluene; esters of acrylic acid and methacrylic acid with alcohols of 1 to 18 carbon atoms, such as methyl methacrylate, butyl acrylate, ethylhexyl acrylate, hydroxypropyl acrylate, dihydrodicylcopentadienyl acrylate, butanediol acrylate and (meth)acrylamides; allyl esters, such as diallyl phthalate; and vinyl esters, such as vinyl ethylhexanoate, vinyl acetate, vinyl propionate, vinyl pivalate, etc. Mixtures of the stated olefinically unsaturated monomers are also suitable. Preferred components II are styrene, α-methylstyrene, chlorostyrene, vinyltoluene, divinylbenzene and diallyl phthalate.

The vinyl ester resins prepared according to the invention can also be cured without dilution with an unsaturated monomer, in the presence of a polymerization initiator. Usually, however, they are diluted with from 0 to 75, preferably from 25 to 75, % by weight of a copolymerizable, ethylenically unsaturated compound. Solutions of the monomer-free vinyl esters in nonpolymerizable solvents can also be used for the production of prepregs and for coating purposes.

Conventional polymerization initiators are peroxides or other organic compounds which form free radicals at elevated temperatures, the said initiators being used in amounts of from 0.05 to 5, preferably from 0.1 to 3, % by weight, based on the total weight of components I+II. Examples of free radical initiators are benzoyl peroxide, tert-butyl peroctoate, tert-butyl perbenzoate, cyclohexanone peroxide, tert-dibutyl peroxide and hydroperoxides, as well as azo compounds, such as azobisisobutyronitrile, and organic compounds having a labile carbon-carbon bond.

If conventional polymerization accelerators, eg. Co, Mn, Sn or Ce salts of organic acids or amines such as N,N-dimethylaniline or N,N-diethylaniline, are added to the peroxide-initiated molding materials, curing can also be carried out without increasing the temperature, if a hydroperoxide or benzoyl peroxide is used. Where conventional photoinitiators, eg. benzoin ethers, benzil ketals or acylphosphine oxide compounds, are used, curing can be carried out by exposure to light of wavelength 200–500 nm.

Suitable inhibitors are the conventional ones, such as hydroquinone, 2,6-dimethylhydroquinone, tert-butylpyrocatechol, p-benzoquinone, chloranil,, 2,6-dimethylquinone, nitrobenzenes, such as m-dinitrobenzene, thiodiphenylamine and salts of N-nitroso-N-cyclohexylhydroxylamine, as well as mixtures of these. The inhibitors are present in the molding materials in general in an amount of from 0.005 to 0.2, preferably from 0.01 to 0.1, % by weight, based on the components I+II.

Suitable inert solvents which may furthermore be present are ketones, esters or hydrocarbons in amounts of up to 100% by weight, based on I+II.

Examples of suitable lubricants are zinc stearate, magnesium stearate and calcium stearate, as well as polyalkylene ether waxes and silicone compounds.

Examples of suitable fillers are conventional finely powdered or granular inorganic fillers, such as chalk, kaolin, quartz powder, dolomite, barite, metal powders, cement, talc, kieselguhr, wood dust, wood chips, pigments and the like. Suitable reinforcing fibers are those consisting of glass, carbon or aromatic polyamide. They are used in amounts of from 20 to 200% by weight, based on I+II.

Examples of thickeners for the novel vinyl ester resins modified with carboxylic anhydrides are alkaline earth metal oxides or hydroxides, such as calcium oxide, calcium hydroxide, magnesium hydroxide and, preferably, magnesium oxide, as well as mixtures of these oxides and hydroxides. These may furthermore be partly replaced by zinc oxide. Polyisocyanates are also useful thickeners. The thickening agents may be added to the molding materials in amounts of from 0.5 to 5% by weight, based on I+II.

The novel vinyl ester resins are preferably cured to give fiber-reinforced shaped articles which possess both high heat stability and good toughness.

EXAMPLE (A) Preparation of a hydroxyarylmelamine derivative 184 g of cyanuric chloride in 500 ml of dioxane were run into a solution of 550 g of the salt of N-methylamino-p-aminophenol with sulfuric acid in 1.3 l of water at room temperature. The pH was brought to 6, after which the mixture was refluxed. After 1.5 hours, the mixture was cooled and the precipitate which had separated out was filtered off under suction. The residue was taken up in ethanol and precipitated with water. After filtration under suction and drying, 420 g (95% of theory) of the product were obtained in the form of pale brown crystals of melting point 226° C.

(B) Preparation of the epoxy resins 400 g of the melamine compound synthesized in section A were dissolved in 2,150 g of epichlorohydrin and the solution was refluxed gently. Thereafter, 217 g of 50% strength NaOH were metered in. The azeotrope of epichlorohydrin and water was distilled off continuously from the reaction vessel, so that the water concentration could be kept at about 1%. After a delay time of 30 minutes, the mixture was cooled to 80° C. and 500 ml of water were added. After phase separation, the organic layer was washed twice with water and then freed from excess epichlorohydrin at 160° C. and under 3 mbar in a thin film evaporator. The brown resin was solid at room temperature and had an epoxide equivalent weight of about 230.

(C) Preparation of the vinyl ester resins 0.2 g of hydroquinone monomethyl ether and 0.5 g of benzyltriethylammonium chloride were added to 230 g of the epoxidized melamine derivative, and the mixture was heated to 100° C. 86 g of methacrylic acid were metered into the stirred mixture and the reaction was carried out for 6 hours. About 95% of all epoxide groups reacted. The resulting vinyl ester was dissolved in 210 g of styrene at 100° C.

(D) Production of the test specimens 2.0% of methyl ethyl ketone peroxide and 1.0% of cobalt naphthenate (1% strength in styrene) were stirred, at 23° C., into the resin solution prepared in section C, and the mixture was poured into a mold consisting of two metal plates 4 mm apart and sprayed with mold release agent. After 2 hours, the molding was removed from the mold and, after 20 hours, was postcured for 2 hours at 160° C. The test panels were tested for mechanical properties, resistance to chemicals and flameproofing properties.

The following properties were measured:

| | |
|---|---|
| Tensile modulus of elasticity: | 3,700 N/mm$^2$ |
| Tensile strength: | 64 N/mm$^2$ |
| Elongation: | 4% |
| Glass transition temperature: | 180° C. |

We claim:
1. An epoxy resin obtained by the reaction of A. an epoxyalkyl halide and B. an aromatic hydroxyl-containing melamine derivative of the formula

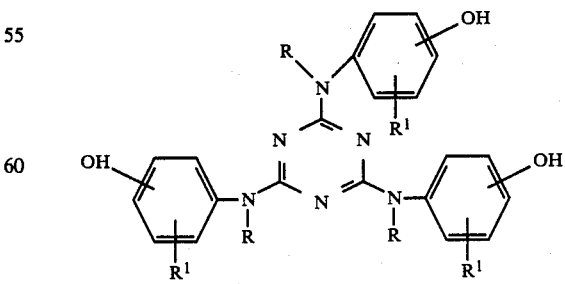

wherein R is hydrogen, alkyl or aryl and R$^1$ is hydrogen, alkyl, aryl, aralkyl or a fused aromatic ring.